(12) United States Patent
Martinez-Barreiro

(10) Patent No.: US 10,748,413 B2
(45) Date of Patent: Aug. 18, 2020

(54) SYSTEM AND METHOD FOR MANAGING AN AIRCRAFT PERSONAL SAFETY DEVICE

(71) Applicant: AEROSENS LLC, Pinecrest, FL (US)

(72) Inventor: Maria-Esther Martinez-Barreiro, Pinecrest, FL (US)

(73) Assignee: AEROSENS LLC, Pinecrest, FL (US)

( * ) Notice: Subject to any disclaimer, the term of this patent is extended or adjusted under 35 U.S.C. 154(b) by 0 days.

(21) Appl. No.: 16/103,964

(22) Filed: Aug. 16, 2018

(65) Prior Publication Data

US 2019/0057598 A1 Feb. 21, 2019

Related U.S. Application Data

(60) Provisional application No. 62/546,684, filed on Aug. 17, 2017.

(51) Int. Cl.
| | |
|---|---|
| *G01S 5/02* | (2010.01) |
| *G06Q 30/02* | (2012.01) |
| *A01M 1/24* | (2006.01) |
| *G08B 26/00* | (2006.01) |
| *B64D 45/00* | (2006.01) |
| *G08B 7/06* | (2006.01) |

(52) U.S. Cl.
CPC ........... *G08B 26/007* (2013.01); *B64D 45/00* (2013.01); *G08B 26/008* (2013.01); *G08B 7/06* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 7,135,976 B2 | 11/2006 | Neff et al. | |
| 7,825,803 B2 | 11/2010 | Neff et al. | |
| 8,548,547 B2* | 10/2013 | Vij | A61B 5/18 600/323 |
| 2007/0085677 A1* | 4/2007 | Neff | G01S 13/08 340/539.22 |
| 2009/0108649 A1* | 4/2009 | Kneller | B64D 11/00 297/217.6 |
| 2009/0309762 A1* | 12/2009 | Wolcken | B64D 45/00 340/945 |
| 2012/0146815 A1* | 6/2012 | Yourkowski | G06Q 10/00 340/945 |

* cited by examiner

*Primary Examiner* — Emily C Terrell
*Assistant Examiner* — Pameshanand Mahase
(74) *Attorney, Agent, or Firm* — Rabin & Berdo, P.C.

(57) ABSTRACT

A system and method for managing an aircraft personal safety device can include an RF signaling device configured to monitor a state or condition of the aircraft personal safety device, and a management device configured to determine the state or condition of the aircraft personal safety device based on communication with the RF signaling device. The method can include associating the RF signaling device with the aircraft personal safety device, and monitoring the state or condition of the aircraft personal safety device by using the management device to receive information from the RF signaling device.

15 Claims, 9 Drawing Sheets

700

By a management device:

Generate signals to interrogate a plurality of RF signaling devices respectively associated with a plurality of personal safety devices arranged in a defined space
701

Receive responses from the plurality of RF signaling devices
702

Compare the responses with historical information
703

Based on the comparing, determine whether there has been a change in a state of any of the plurality of personal safety devices
704

Based on determining that there has been a change in the state of any of the plurality of personal safety devices, generate a corresponding visible indication of the change
705

Record changes in a database
706

SYSTEM AND METHOD FOR MANAGING AN AIRCRAFT PERSONAL SAFETY DEVICE

CROSS-REFERENCE TO RELATED APPLICATION

This application claims the benefit of the earlier filing date of provisional application No. 62/546,684, filed Aug. 17, 2017.

TECHNICAL FIELD

This application relates generally to an aircraft personal safety device, and more specifically to a system and method for tracking and managing aircraft personal safety devices.

BACKGROUND

Aircraft personal safety devices, such as life vests or other kinds of emergency devices, are often deployed in large-scale commercial transportation. Commercial passenger aircraft, for example, are required to provide aircraft personal safety devices and make them accessible to their passengers.

SUMMARY

This application relates to a system and method for managing an aircraft personal safety device. The system can include an RF (radio frequency) signaling device configured to monitor a state or condition of an aircraft personal safety device. The system can further include a management device configured to determine the state or condition of the aircraft personal safety device based on communication with the RF signaling device. The method can include associating an RF signaling device with an aircraft personal safety device, and monitoring a state or condition of the aircraft personal safety device by using the management device to receive information from the RF signaling device.

BRIEF DESCRIPTION OF THE DRAWINGS

FIG. 7 is another flowchart illustrating a process or method that can be performed using the system;

DETAILED DESCRIPTION

Figure 1:
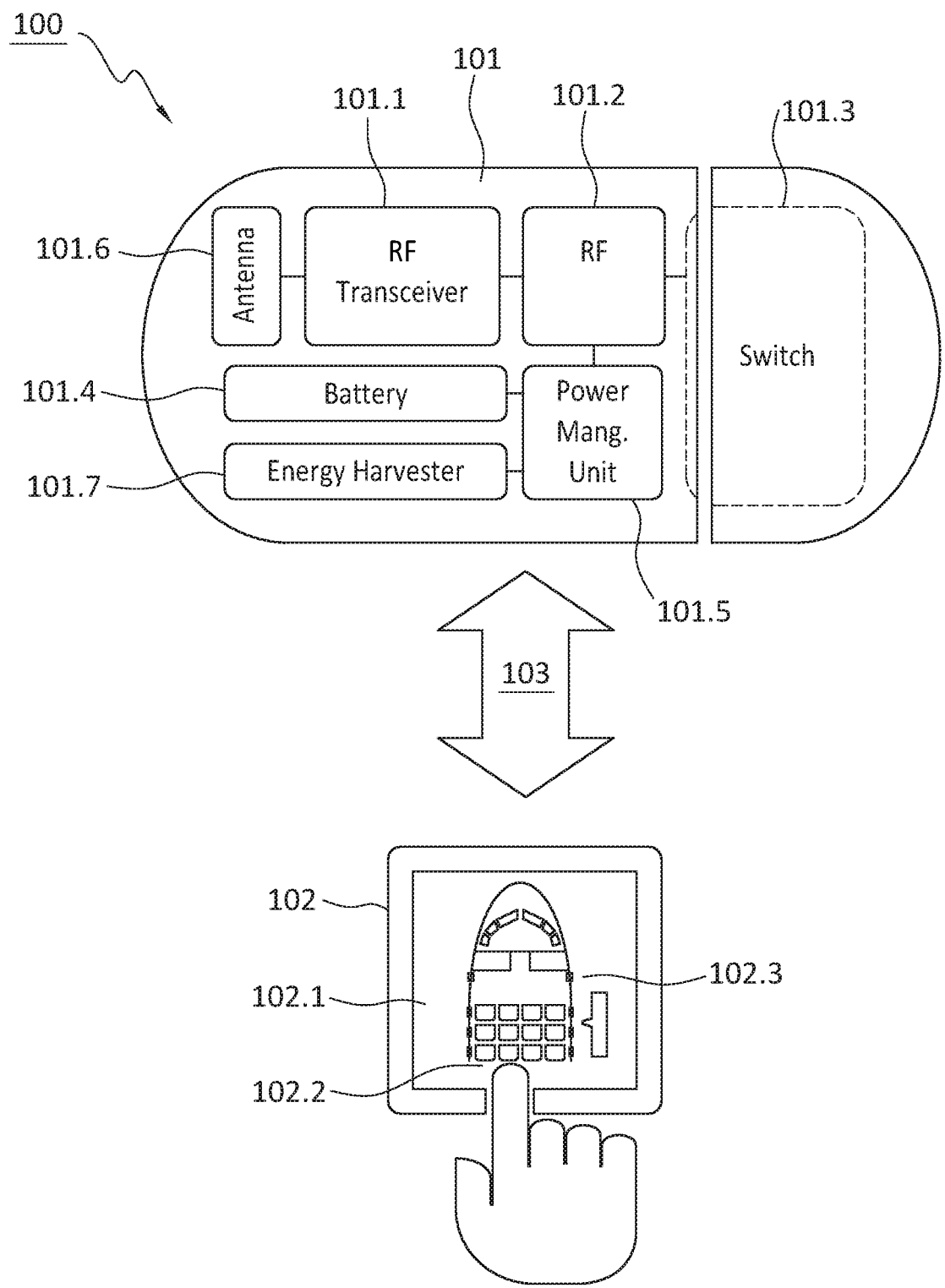
FIG. 1 shows an illustrative embodiment of a system for managing an aircraft personal safety device.

In various non-limiting embodiments, a system and method as described herein can facilitate tracking and management of an aircraft personal safety device. The system can include an RF (radio frequency) signaling device and a management device that communicate with each other.

The RF signaling device can be associated with the aircraft personal safety device and be configured to generate or output a signal or signals reporting on the state or condition of the aircraft personal safety device. By generating or outputting the signal or signals, the RF signaling device can register or report or otherwise provide notification of an event that occurs in connection with the aircraft personal safety device. The event can be, for example, a container of the aircraft personal safety device being opened, or the aircraft personal safety device or its container being damaged or moved or mishandled or subject to unauthorized access. The event can be an expiration of a service life or period of utility of the aircraft personal safety device. The event can be an inspection or interrogation of the RF signaling device by the management device.

The management device can be configured to receive the signal generated by the RF signaling device and generate at least one of a visible or audible notification in response to the signal. To this end, the management device can include a processor configured to perform operations in response to the signal, and a display device coupled to the processor and configured to, under control of the processor, display information corresponding to the signal.

The RF signaling device can be configured to generate or output a signal or signals in response to a request or query or interrogation by the management device, or independently of interrogation by the management device. Either independently or in response to the interrogation, the RF signaling device can output a signal or signals indicating any one or combination of a unique identifier, a current state or condition associated with the unique identifier, and a location associated with the unique identifier.

The aircraft personal safety device and its associated RF signaling device can be provided in a defined space. In one illustrative, non-limiting application, the defined space can be in a vehicle of mass transportation, such as a commercial passenger aircraft. In particular, a plurality of aircraft personal safety devices and their respective associated RF signaling devices can be provided in the vehicle of mass transportation, each of the plurality of aircraft personal safety devices having an assigned location. The management device can be used to monitor the plurality of aircraft personal safety devices in the vehicle of mass transportation. For example, the management device can interrogate or issue a query or request to the respective associated RF signaling devices of the plurality of aircraft personal safety devices. In response, each of the RF signaling devices can report back to the management device with a signal or signals indicating at least one of a unique identifier, a current state or condition, or a location. Additionally, or alternatively, any one of the RF signaling devices can, independently of a query or interrogation by the management device, report a change in a state or condition associated with any one or a combination of an identifier and a location. The change can be in response to an event as described above, for example. The management device can receive the report and display or otherwise indicate corresponding information.

The above-described configuration provides several advantages. For example, tampering or unauthorized access, or damage, to an aircraft personal safety device can be automatically detected and reported, and the appropriate measures taken in response, such as inspecting and replacing the damaged or tampered-with aircraft personal safety device. Additionally, expiration of a service life or period of utility of an aircraft personal safety device can be automatically detected and reported, and the appropriate measures taken in response, such as replacing the aircraft personal safety device having the expired service life. Further, a safety inspection of a vehicle of mass transportation, e.g., a commercial passenger aircraft, can be quickly and efficiently performed, by using the management device to interrogate a plurality of aircraft personal safety devices arranged in a space of the vehicle, and based on the responses of the plurality of aircraft personal safety devices, determine whether all required aircraft personal safety devices are present and whether any of the required aircraft personal safety devices have been damaged, tampered with, or have aged out of their periods of utility, and need to be repaired or replaced.

Referring to FIG. 1, a system 100 for managing an aircraft personal safety device can include an RF signaling device 101 and a management device 102. The RF signaling device 101 can be or include, for example, an "RF tag" or "RFID tag" ("radio frequency identification tag"), which is a known, commercially-available product. The RF signaling device 101 can include an RF transceiver 101.1 configured to modulate and demodulate RF signals (e.g. in wireless technologies such as Bluetooth™ and WiFi), coupled to an antenna 101.6 configured to transmit and receive the RF signals. The RF signaling device 101 can further include a battery 101.4 configured to provide power to the RF signaling device 101, and an energy harvester 101.7 configured to harvest ambient energy, such as RF energy, kinetic energy (e.g., vibration), thermal energy or solar energy, to supplement the power provided by the battery 101.4. The battery 101.4 and the energy harvester 101.7 can each be coupled to a power management unit 101.5 configured to manage and optimize power usage by the RF signaling device 101, by controlling aspects of the operations of the battery 101.4 and the energy harvester 101.7. The RF transceiver 101.1 and power management unit 101.5 can each be coupled to a controller (or microcontroller) 101.2 configured to control operations of the RF transceiver 101.1, the antenna 101.6, the power management unit 101.5, the battery 101.4 and the energy harvester 101.7.

In non-limiting embodiments, the RF signaling device 101 can use, for example, Bluetooth™ Low Energy (BLE) technology. An operating frequency of the RF signaling device 101 can be, for example, approximately 2.402-2.480 GHz, and an operating temperature of the RF signaling device 101 can be, for example, between −20° C. and +70° C. Dimensions of the RF signaling device 101 can be, for example, 45×34×14 mm or 1.8×1.4×0.6 in. The RF signaling device 101 can weigh, for example, 20 grams or 0.04 pounds (battery included). A housing material of the RF signaling device 101 can be, for example, ABS plastic. The RF signaling device can, for example, use one coin-cell battery and have 4 dBm output power. The BLE technology can have −93 dBm sensitivity.

The controller 101.2 can further be coupled to a detection device, such as a switch 101.3. The switch 101.3 can be, e.g., a magnetic or mechanical switch. The switch 101.3 can be configured to detect an occurrence of an event, as described above, in connection with an aircraft personal safety device associated with the RF signaling device 101. For example, the switch 101.3 can assume one of an off state or an on state based on or in response to a container of the aircraft personal safety device being opened, the aircraft personal safety device or its container being damaged or moved or mishandled or subject to unauthorized access, or an expiration of a service life of the aircraft personal safety device. The controller 101.2 can receive a signal from the switch 101.3 indicating the state or condition of the switch 101.3 and can perform operations in response to the signal. Specifically, for example, in response to the detection device 101.3 detecting a change in the state of the aircraft personal safety device based on an occurrence of an event as described above, the controller 101.2 can cause the change to be reported to a management device.

To this end, the RF signaling device 101 can transmit and receive information 103 under control of the controller 101.2. For example, the RF signaling device 101 can transmit information 103 to, and receive information 103 from, a management device 102. The information 103 can be in the form of modulated electromagnetic radiation transmitted by the RF transceiver 101.1 and the antenna 101.6 in response to control signals from the controller 101.2, or modulated electromagnetic radiation received by the antenna 101.6, and processed and interpreted by the RF transceiver 101.1 and the controller 101.2.

The management device 102 can include a display device 102.1 configured to generate display information 102.3 including any one of, or a combination of, images and text. The management device 102 can further include an input device 102.2 configured to receive input from a user to control operations performed by the management device 102. The input device 102.2 can include any kind of device or interface for communicating user input to the management device, such as but not limited to a touch-sensitive display screen, a keyboard, voice-activated control or the like. The management device 102 can be or include, for example, a smartphone, a tablet or other handheld device having a graphical user interface for interactive user control of the management device 102.

Figure 2:
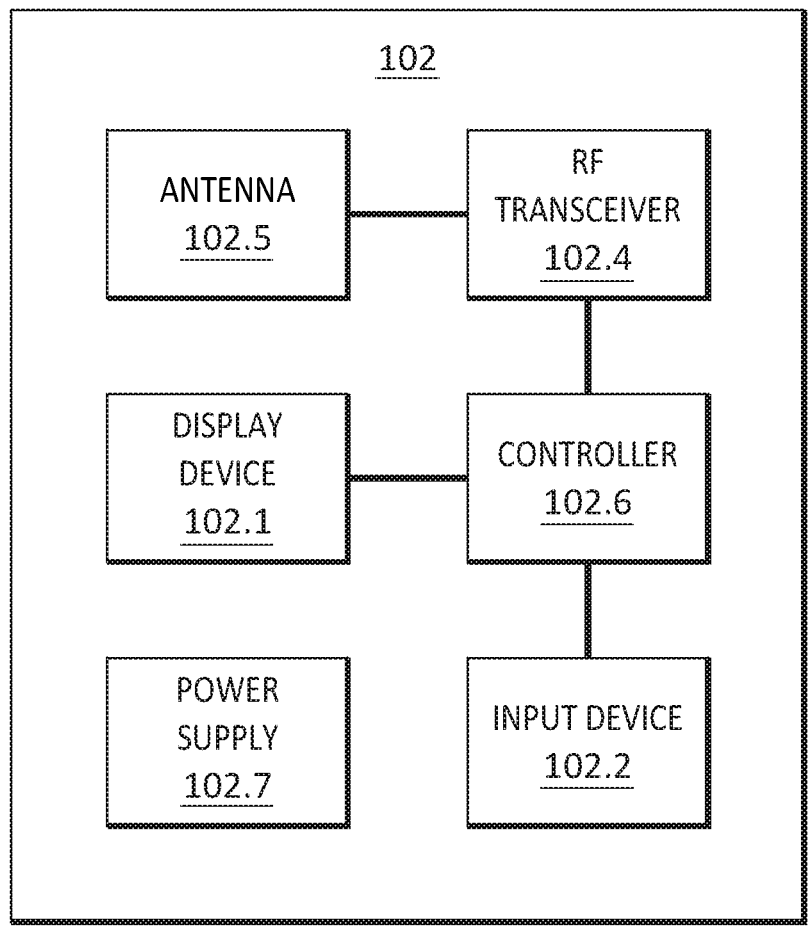
FIG. 2 is a block diagram showing components of a management device of the system.

FIG. 2 shows a functional block diagram of the management device 102. As shown in FIG. 2, the management device 102 can include a communication device such as an RF transceiver 102.4 coupled to an antenna 102.5. The RF transceiver 102.4 and the antenna 102.5 can be configured to transmit and receive radio waves. The RF transceiver 102.4 and the display device 102.1 can be coupled to a controller 102.6. The controller 102.6 can be coupled to the input device 102.2 and be configured to perform operations in response to user input received by way of the input device 102.2. A power supply 102.7 of the management device 102 can provide power to the management device 102.

Figure 3:
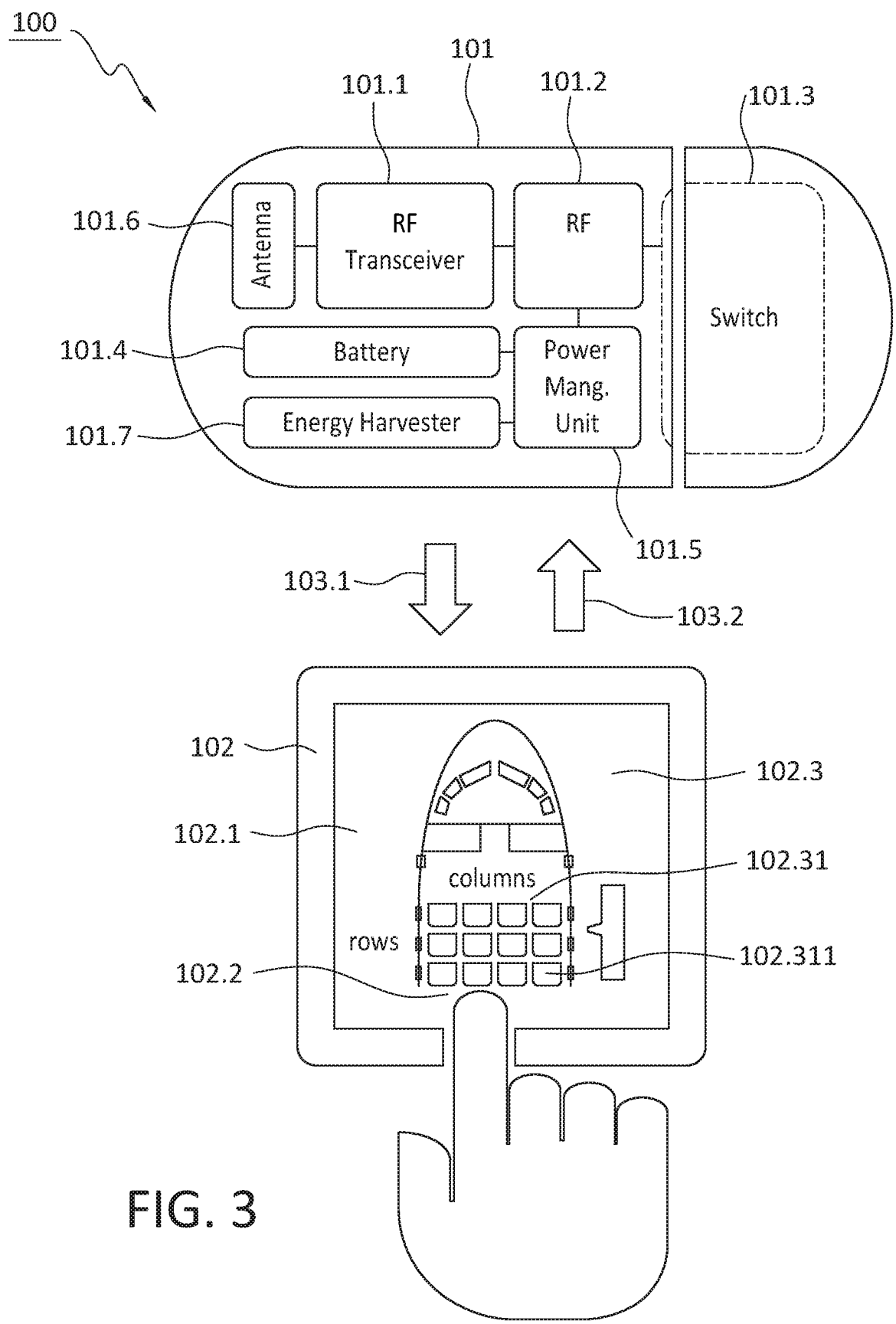
FIG. 3 shows another view of the system.

FIG. 3 shows another view of the system 100. As shown in FIG. 3, the RF signaling device 101 can transmit a signal 103.1 to the management device 102. The signal 103.1 can include a unique identifier of the RF signaling device 101. In non-limiting embodiments, the unique identifier can include a MAC address of a Bluetooth™ device. The MAC address can include a status counter, a firmware version and a battery status. The signal 103.1 can further include information indicating a current state or condition of the RF signaling device 101, or a change in the state or condition of the RF signaling device 101. The controller 102.6 of the management device 102 can be configured to process the information to determine the state of the aircraft personal safety device associated with the RF signaling device 101.

More specifically, the management device 102 can receive the signal 103.1 and perform an operation in response. For example, the controller 102.6 of the management device 102 can be configured to, in response to the signal 103.1, process information in the signal 103.1 to determine the state of the RF signaling device 101 and perform operations to cause the display device 102.1 to generate display information 102.3 corresponding to the state or condition of the RF signaling device 101, and thereby, the state or condition of an aircraft personal safety device associated with the RF signaling device 101. For example, if the state or condition of the RF signaling device 101 is unchanged, the display information 102.3 can be unchanged. On the other hand, if the state or condition is changed, the display information 102.3 can be changed to indicate the changed state or condition.

The management device 102 can transmit a signal 103.2 to the RF signaling device 101. The signal 103.2 can include an interrogation signal that requests that the RF signaling device 101 respond with its current state or condition and other information.

The display information 102.3 can include an image representing a defined space. The display information 102.3 can further represent a location of an RF signaling device 101 and an associated aircraft personal safety device within the defined space. The defined space can be in an interior of a structure, such as an aircraft cabin. For example, the display information 102.3 can include graphical representations 102.31, e.g., shapes and colors, respectively corresponding to a distribution or mapping of a plurality of RF signaling devices 101 and their respective associated aircraft personal safety devices with respect to a coordinate system within the defined area, and a current state of each of the plurality of RF signaling devices 101 and its associated aircraft personal safety device. The graphical representations 102.31 can, for example, represent the plurality of RF signaling devices 101 and their associated aircraft personal safety devices as being arranged in an organized fashion, such as in row and columns.

The management device 102 can be configured to receive user input by way of the input device 102.2. For example, in response to the user input, the controller 102.6 can perform operations to cause the RF transceiver 102.4 and the RF antenna 102.5 to transmit the signal 103.2 to interrogate each of the plurality of RF signaling devices 101 to determine their states. In response, the plurality of RF signaling devices 101 can each transmit the signal or signals 103.1 to the management device 102. In response to the signal or signals 103.1 the controller 102.6 can perform operations to cause the display information 102.3 to be updated to indicate the current state of each of the plurality of RF signaling devices 101 and its associated aircraft personal safety device.

Figure 4:
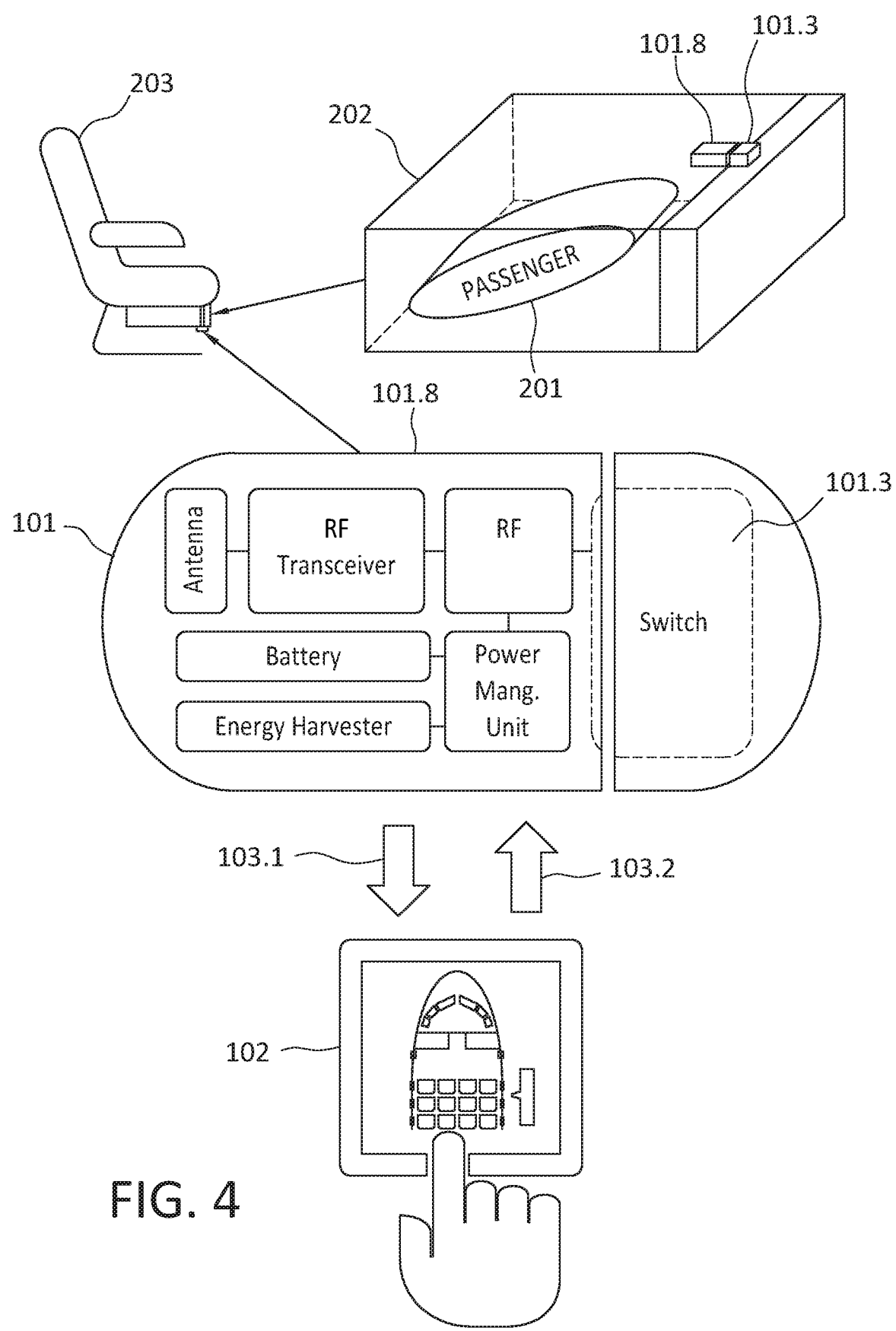
FIG. 4 shows the system in use in one illustrative, non-limiting application with a passenger life vest.

FIG. 4 shows the system 100 in use in one non-limiting, illustrative application. The RF signaling device 101 can be associated with an aircraft personal safety device 201, such as a passenger life vest or other kind of emergency device. For example, the RF signaling device 101 can be associated with (e.g., coupled or connected or fastened or affixed to) a container 202 of the aircraft personal safety device 201. In non-limiting embodiments, the RF signaling device 101 can be attached to the container 202 with a high-performance acrylic adhesive, for example.

The aircraft personal safety device 201 and its associated RF signaling device 101 be can be associated with a location within a space of a vehicle of transport. For example, the aircraft personal safety device 201, or a container 202 containing the aircraft personal safety device 201, can be associated with a seat 203 in a cabin of an aircraft. The container 202, with the aircraft personal safety device 201 inside, and the associated RF 101 can be placed under the seat 203, for example.

After the aircraft personal safety device 201 and its associated RF signaling device 101 are associated with the location within the space in the vehicle of transport, the management device 102 can be used to track and monitor the state of the aircraft personal safety device 201 by communicating with its associated RF signaling device 101. For example, as discussed above, in response to user input, the management device 102 can interrogate the RF signaling device 101 to determine its state. Further, the management device 102 can be used to track and monitor a plurality of RF signaling devices 101, each associated with a location in the vehicle of transport. Specifically, for example, the management device 102 can interrogate a plurality of RF signaling devices 101, each located under a seat in the cabin of an aircraft.

In response to the interrogation by the management device 102, each RF signaling device 101 can transmit a signal or signals indicating its state or condition, and thereby indicate a state or condition of an associated aircraft personal safety device 201. The management device 102 can receive the signals and update its display accordingly.

The RF signaling device 101 need not transmit the signal to indicate its state or condition only in response to interrogation by the management device 102. Instead, the RF signaling device 101 can continually or periodically transmit the signal indicating its state independently of the interrogation, and the management device 102 or other monitoring device can be configured to continually or periodically perform an operation, such as polling, to detect a change in the state or condition.

The state or condition of the RF signaling device 101 can change, for example, by an operation of the switch 101.3. The switch 101.3 can, in response to manipulation of the container 202 of the aircraft personal safety device 201, change in state from off to on, or from on to off. The change in state of the switch 101.3 can be caused, for example, by a break or interruption in electrical contact of the switch 101.3 with a main body 101.8 of the RF signaling device 101 due to opening of the container 202. In response to the change in state of the switch 101.1, the controller 101.2 can perform an operation to cause the RF transceiver 101.1 and the antenna 101.6 to transmit the signal 103.1 indicating the change in state of the switch 101.3. In response to detecting the signal 103.1, the management device 102 can update its display information 102.3. Other events that can cause the switch 101.3 to change state include, for example, mishandling of or damage to the container 202 or the aircraft personal safety device 201, or expiration of a time period corresponding to a service life of the aircraft personal safety device 201.

Figure 5:
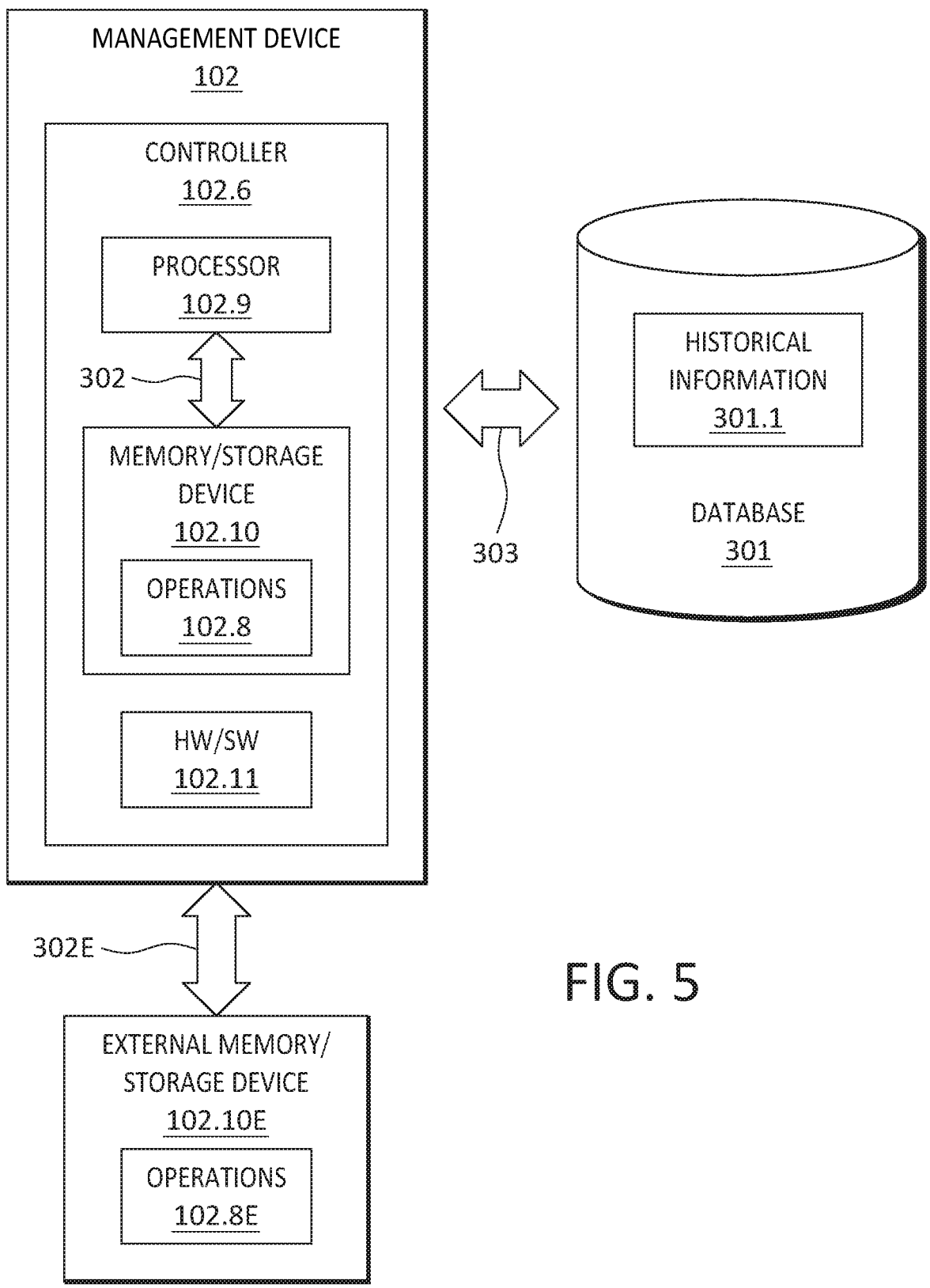
FIG. 5 is another block diagram showing components of the management device.

Referring to FIG. 5, the controller 102.6 of the management device 102 can include a processor 102.9 and a memory or other electronic storage device 102.10. The memory/storage device 102.10 can store operations 102.8. The processor 102.9 can communicate via signals 302 with the memory/storage device 102.10 to perform the operations 102.8 to implement the methods and operations described herein. The processor 102.9 can include, for example, a general-purpose CPU (central processing unit) configured to fetch and execute instructions, corresponding to operations 102.8, stored in the memory 102.10 to implement the methods and processes. Additionally, or alternatively, the controller 102.6 can include any other hardware, firmware or software combinations 102.11 configured or configurable to carry out the methods and processes, such as one or more ASICs (application-specific integrated circuits) configured to carry out the methods and processes. In light of the foregoing, the term "processor" as used herein is intended to encompass standalone processors, as distinct from memory, as well as the combination of a processor and a memory, typically referred to as a computer, as well as any other hardware, firmware or software combinations configured or configurable to carry out the methods and processes described herein. The memory/storage device 102.10 can include any kind of machine-readable medium configurable to store information electronically, such as RAM (random access memory) or ROM (read-only memory). The management device 102 can communicate with a memory/storage device 102.10 internal to the management device 102 or the controller 102.6 but is not limited in this regard. The management device 102 can also communicate, for example, via signals 302E with an external memory/storage device 102.10E storing processor-executable operations 102.8E to carry out the methods and processes described herein. The memory/storage device 102.10 and the external memory/storage device 102.10E can include any kind of machine or computer-readable media. Examples of machine/computer-readable storage media include, but are not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store information electronically and which can be accessed by a processor or computer.

The management device 102 can communicate with a database 301 external to the management device 102 by electronically exchanging signals 303 with the database 301. The database 301 can be a machine/computer-readable storage medium along the lines described previously. The database 301 can store historical information 301.1. The historical information 301.1 can include information collected over a period of time concerning RF signaling devices 101 and their associated aircraft personal safety devices 201. For example, the historical information 301.1 can indicate an initial distribution of the aircraft personal safety devices in a defined space, an initial state of each of RF signaling devices 101 associated with the aircraft personal safety devices, and an initial service life of each of the aircraft personal safety devices 201. In response to a request from the management device 102, the database 301 can provide the historical information 301.1 to the management device 102. Further, the management device 102 can write or update or otherwise record new or changed historical information 301.1 to the database 301 at various intervals of time, thus collecting historical information regarding the RF signaling devices 101 and their associated aircraft personal safety devices 201.

Figure 6:
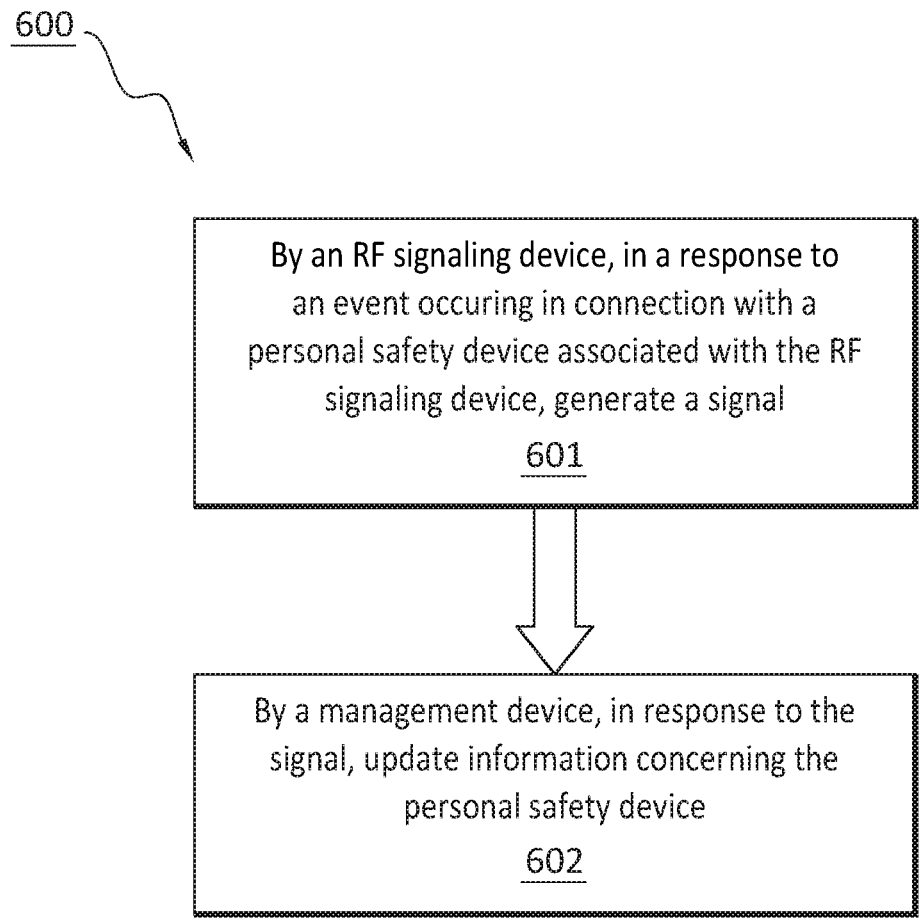
FIG. 6 is a flowchart illustrating a process or method that can be performed using the system.

FIG. 6 is a flowchart showing a non-limiting, illustrative process or method 600 that can be carried out by the system 100. As shown in block 601, in response to an event that occurs in connection with an aircraft personal safety device 201, an RF signaling device 101 associated with the aircraft personal safety device 201 can generate a signal or signals and transmit the signal or signals. As shown in block 602, a management device 102 can receive the signal or signals transmitted by the RF signaling device 101 and, in response to the signal or signals, update information associated with the aircraft personal safety device 201. The updating the information concerning the aircraft personal safety device can include displaying a state and a location of the aircraft personal safety device.

Information in the signal or signals transmitted by the RF signaling device 101 can include a current state or condition, an identifier and a location. The management device 102 can interpret the information in various ways to generate or output updated information about the aircraft personal safety device 201 associated with the RF signaling device 101.

For example, if the RF signaling device 101 transmitted the information independently of an interrogation by the management device 102, the management device 102 can interpret the information as reporting a tampering or damage event and generate an alert so that appropriate measures can be taken.

On the other hand, the RF signaling device 101 can transmit the information in response to an interrogation by the management device 102 as part of a regular, scheduled inspection, for example, an inventory. In this situation, the information can indicate, for example, a normal or unchanged condition, if the information from the RF signaling device 101 is unchanged from a previous time that an inspection was performed.

FIG. 7 is another flowchart showing a non-limiting, illustrative process or method 700 that can be carried out by the system 100. The process of FIG. 7 can occur as part of a regular, scheduled inspection, such as a pre-flight inspection of a commercial passenger aircraft. As shown in block 701, a management device 102 can generate or issue or transmit a signal or signals to each of a plurality of RF signaling devices 101 associated with a respective aircraft personal safety device 201 in a defined space, such as an aircraft cabin. The signal can be an interrogation or request that each of the plurality of RF signaling devices 101 report its identifier, current state and location.

As shown in block 702, the management device 102 can receive a response (or non-response) from each of the plurality of RF signaling devices 101. As shown in block 703, the management device 102 can compare the responses with previously-stored historical information, such as historical information 301.1 retrieved from a database 301 and stored in a memory/storage device 102.10 or 102.10E.

The previously-stored historical information 301.1 can contain records, collected and updated over a period of time, regarding each of the plurality of RF signaling devices 101. For example, the historical information 301.1 can indicate an identifier, a state and location of each RF signaling device 101 at a time of its initial installation or deployment in a defined space, such as under the seat of an aircraft. The historical information 301.1 can further indicate a remaining service life of an associated aircraft personal safety device 201. The historical information 301.1 can, for example, indicate the location of the RF signaling device 101 and its associated aircraft personal safety device 201 within the defined space in terms of a corresponding row and column in an arrangement of seats, or a seat number or other seat identifier, or the like. However, the location information is not limited in this respect and can be recorded and indicated in other ways, such as by GPS coordinates.

As shown in block 704, by comparing the responses (or absence of responses) from the plurality of RF signaling devices 101 in the defined space with the historical information 301.1, the management device 102 can determine the state or condition of the aircraft personal safety devices 201, and more particularly whether the state or condition of any of the aircraft personal safety devices 201 has changed. For example, based the response of one or more of the RF signaling devices 101, the management device 102 can determine that the container(s) 202 of the associated aircraft personal safety device(s) 201 may have been opened or tampered with or mishandled or damaged. Additionally, the management device 102 can determine that all of the aircraft personal safety devices 201 that are expected or required to be present within the defined space are in fact present and in good or satisfactory condition. On the other hand, an absence of a response from an RF signaling device 101 can indicate that an associated aircraft personal safety device 201 that is expected or required to be present within the defined space is not present. Another kind of response can indicate that one or more of the aircraft personal safety devices 201 is not in the location where it was previously, indicating that the personal safety 201 device(s) may have been improperly moved or mishandled. The management device 102 can further determine, for example, that one or more of the aircraft personal safety devices 201 has exceeded its service life.

As shown in block 705, the management device 102 can update the information concerning the aircraft personal safety devices 201. The updating can include displaying information indicating a current state and location of each of the plurality of aircraft personal safety devices 201 in the defined space, for example in a representation of a distribution of the plurality of personal devices 201 in respective locations in the defined space. The representation can correspond to the interior of an aircraft, for example. In particular, the updating of the information concerning the aircraft personal safety devices 201 can include, based on determining that there has been a change in the state of any of the plurality of aircraft personal safety devices 201, generating a corresponding visible indication of the change.

As shown in block 706, the updating of the information concerning the aircraft personal safety devices 201 can further include saving or storing the result of the interrogation by the management device 102, including a record of any changes in previous states of the aircraft personal safety devices 201, in the memory/storage device 102.10 and to the database 301. This information can then be retrieved at a later time, for example, a next pre-flight inspection, to again determine the condition of the aircraft personal safety devices 201 on the aircraft so that appropriate action can be taken if needed.

As noted earlier, the signal or message or report output by the RF signaling device 101 or plurality of RF signaling devices 101 can be received by a management device 102. In response to receiving the signal or message or report, the management device 102 can generate or output corresponding information. The information generated by the management device 102 can include a visible display indicating the state or condition, and the location, of the RF signaling device 101 issuing the signal or message or report.

For example, referring to FIG. 3, a visible alert can be in the form a change in appearance associated with a graphical representation of an RF signaling device 101 and its associated aircraft personal safety device 202. Referring to graphical representations 102.31 in FIG. 3, for example, an icon 102.311 in a particular row and column can be caused to change color, to blink, to change in opacity or transparency, to indicate text information, or to give any other kind of visible indication of a change. For example, a normal state for a given RF signaling device 101 and its associated aircraft personal safety device 201 can be indicated by an icon 102.311 corresponding to the RF signaling device 101 and its associated aircraft personal safety device 201 being a particular color, such as green. If an aircraft personal safety device 201 is absent from a location where it is expected, its corresponding icon 102.311 can be made to blink or be transparent, for example. Similarly, other states such as "change" or "alert" or "expired" or "tamper" or "damage" or "malfunction" or "no response" state could each be assigned a color code or other appearance, and/or a text code. Alerts can be audible as well as visible.

Figure 8:
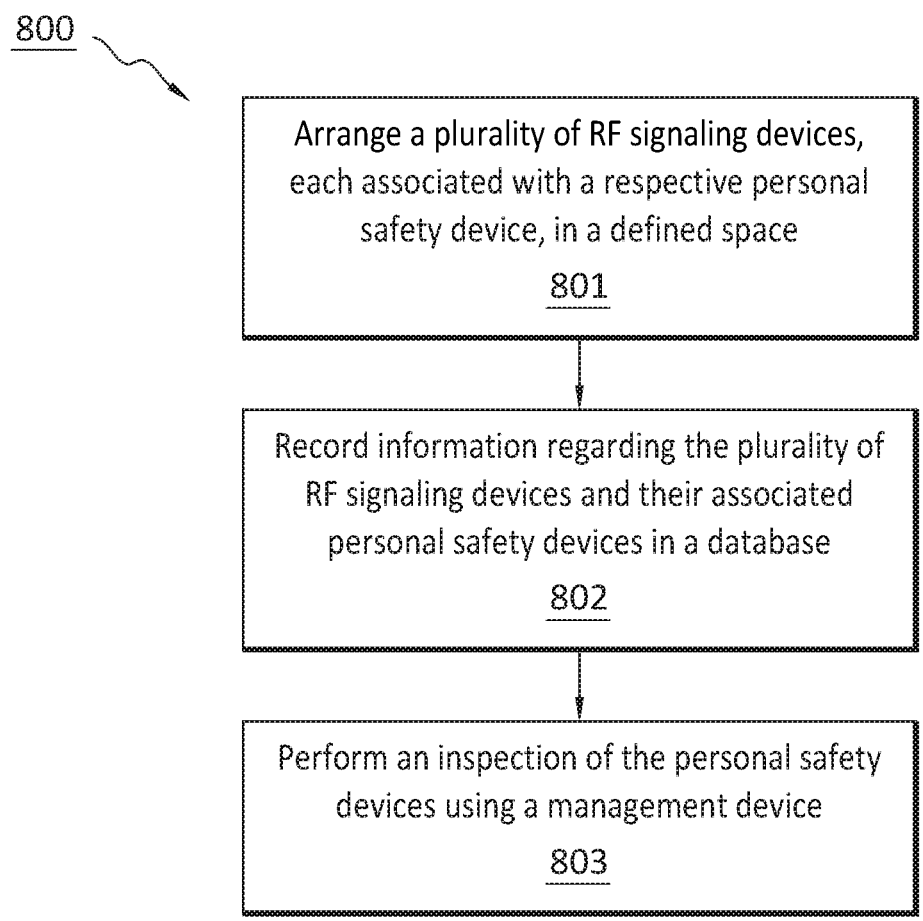
FIG. 8 is still another flowchart illustrating a process or method that can be performed using the system.

FIG. 8 is another flowchart showing a non-limiting, illustrative process or method 800 that can be carried out by the system 100. As shown in block 801, a plurality of RF signaling devices 101, each associated with a respective aircraft personal safety device 201, can be arranged in a defined space, such as under the seats of a cabin in a passenger aircraft.

As shown in block 802, after the plurality of RF signaling devices 101 and associated aircraft personal safety devices 201 are so arranged, information regarding their respective states, locations and service lives can be in recorded in a database, such as database 301.

As shown in block 803, subsequently to arranging the plurality of RF signaling devices 101 and their associated aircraft personal safety devices 201 in the defined space and recording the information regarding their respective states, locations and service lives, an inspection can be performed using a management device 102. The inspection can be a pre-flight inspection, for example. Inspections can be performed regularly and periodically at scheduled intervals.

The inspection can include performing a process or method such as 700, as described previously in connection with FIG. 7. Based on the result of the inspection, appropriate action can be taken, such as undertaking a more detailed inspection of RF signaling devices 101 reporting anomalous results, replacing or repairing defective RF signaling devices 101 and/or aircraft personal safety devices 201, or providing aircraft personal safety devices 201 when the inspection indicates that they are required but absent.

Figure 9:
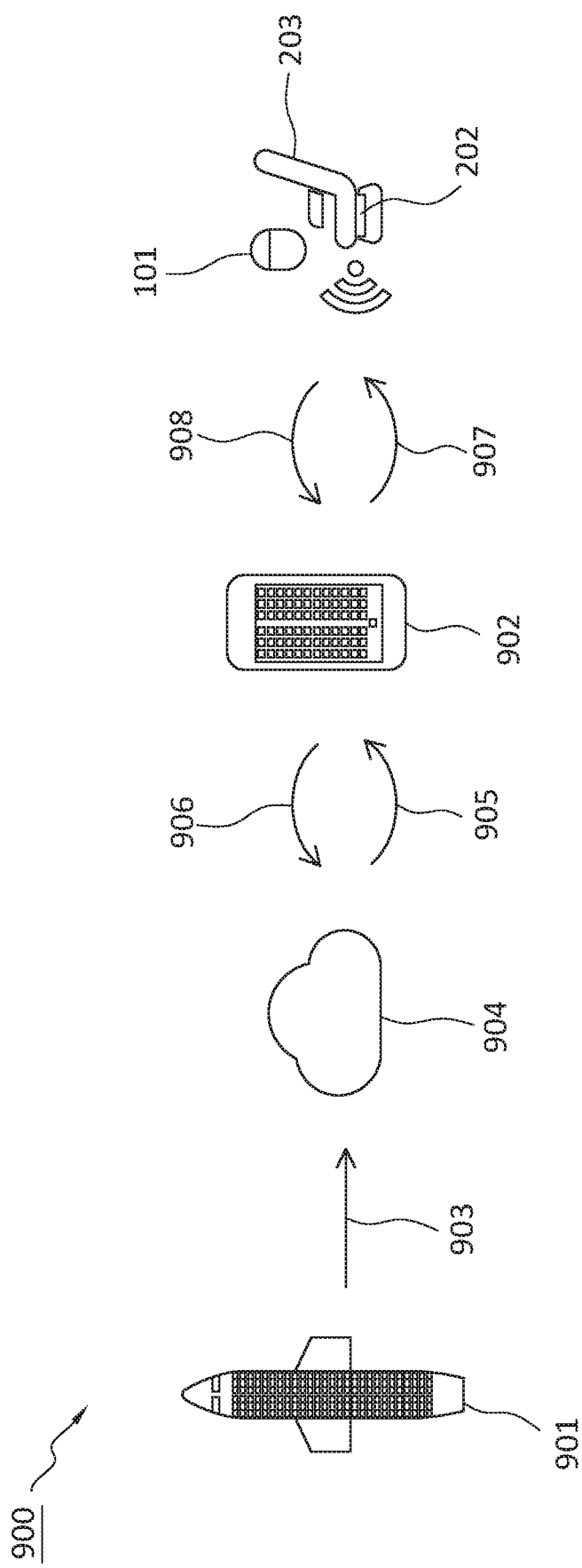
FIG. 9 shows another illustrative embodiment of a system for managing an aircraft personal safety device.

FIG. 9 illustrates another non-limiting embodiment 900. System 900 can include aircraft information 901. The aircraft information 901 can include LOPA (Layout of Passenger Accommodations) information, for example. LOPA information can include an engineering diagram of an aircraft's cabin interior indicating, for example, locations of passenger and flight attendant seats, emergency equipment, exits, lavatories, and galleys. The aircraft information 901 can further include such information as aircraft number, seat location information such as row number and seat letter, and all related personal safety equipment information such as manufacturer, part number, serial number, expiry date, and unique identifier for equipment. The aircraft information 901 can be in CSV (comma separated file) format, for example.

The aircraft information 901 can be uploaded 903 to a network 904 of interconnected servers accessible through a telecommunications system. Such a network can be referred to as "the cloud," and can be or include, for example, the Internet or World Wide Web. A server or servers, and associated storage devices, of the network or cloud 904 can be or include one non-limiting embodiment of the database 301 discussed previously in connection with FIG. 5. The aircraft information 901 can be downloadable to a mobile device 902 such as a smartphone configured to function as a management device 102 (i.e. the mobile device 902 can be one non-limiting embodiment of the management device 102). The mobile device 902 can include application software that performs operations based on or using the aircraft information 901. The application software can be one non-limiting embodiment of the operations 102.8 or 102.8E discussed previously in connection with FIG. 5.

The mobile device 902 can connect to the network/cloud 904 and download 905 the aircraft information 901 to the mobile device 902. The aircraft information 901 can include a list or lists of aircraft by number, for example. Via an interface of the mobile device 902, an aircraft identifier, such as a number, can be selectable by a user. In response to the selection, the application software of the mobile device 902 can download 905 information 901 from the network/cloud 904 for the specific aircraft corresponding to the selection. The downloaded information 901 can be cached on the mobile device 902.

The application software of the mobile device 902 can generate a display on the mobile device 902 corresponding to the downloaded information 901. In generating the display, the application software can process the information 901 to, for example, recognize or determine such information as classes or types of seat locations (e.g., whether a seat is in the business class section of the aircraft or in the economy section), whether the seat is a passenger seat, a crew seat, is in the cockpit or adjacent to overhead bin space. The application software can recognize or determine a row number and seat letter (corresponding to a column, e.g.,) of a seat. Based on processing of the downloaded information 901, the application software can map a position of each seat of the selected aircraft to a display presented on a screen of the mobile device 902. The display can correspond to a physical layout of the selected aircraft.

The application software can execute operations to cause the mobile device 902 to interrogate 907 RF signaling devices 101 assumed to be present in the interior of an aircraft. Each RF signaling device 101 can respond 908 to the interrogation 907 by the mobile device 902 with information including a unique device identifier, a location and a status (e.g., whether a corresponding container 202 is open or closed, or has been tampered with). The interrogation 907 and response 908 can correspond to signals 103.2 and 103.1, respectively, discussed previously in connection with FIG. 3. Based on the response 908 received by the mobile device 902 from each RF signaling device 101, a color or other indication of a location corresponding to the responding RF signaling device 101 in the display of the mobile device 901 can be changed to indicate the status reported by the responding RF signaling device 101. In non-limiting embodiments, before interrogation by the mobile device 902, the application software can assume that there are no RF signaling devices 101 installed on the aircraft and can create an original or base data file that specifies an initial distribution of the RF signaling devices 101 installed on the aircraft, by identifier, location and status, by processing and storing the information collected by interrogation of the RF signaling devices 101 installed on the aircraft. This original or base data file can be compared with information collected by subsequent interrogation to detect any changes or irregularities.

The data files collected by the interrogation can be uploaded 906 by the application software executing on the mobile device 902 to the network/cloud 904, where any authorized user can easily and conveniently access the data files to quickly determine the status of the containers 202 on any selected aircraft. The download 905 and the upload 906 can correspond to signals 303 discussed previously in connection with FIG. 5.

In view of the foregoing, the system 100 can provide significant improvements to the field of safety technology. In particular, for example, in the application of managing large numbers of aircraft personal safety devices in large-scale commercial transportation such as in commercial aviation, the system 100 can provide fast response, convenience, accuracy and ease.

In more detail: commercial passenger aircraft include safety devices for use by passengers in case of a crash or ditching; the safety devices are, for example flotation devices. Some flotation devices are simple members of buoyant material. Inflatable life vests, packed in a folded condition, are also used. Such life vests must be stored in a manner and location so that they will not be damaged during normal operations but can be easily and quickly put into use during an emergency. Accordingly, many modern aircraft seating units include a pouch or container underneath the seat cushion where the life vest is readily accessible to the passenger.

Unfortunately, life vests stored in such an easily accessible location are subject to tampering and theft. Government regulations also require airlines to visually inspect each life vest pouch prior to operation of the aircraft. In conventional systems, the regulation requires each pouch to be opened, inspected, closed and then resealed. This requires a significant amount of man-hours to inspect each aircraft before every flight, which is an enormous financial drain for the airlines. To ensure the presence of each required life vest, at least two types of inspection are often conducted. The first is a pre-flight inspection, which is typically made by the flight attendant or gate mechanic. This pre-flight inspection confirms the presence of a life vest under each aircraft seat or in places where life vests are otherwise required. If any given live vest is missing, the life vest is replaced or the seat is not used during the flight. The second is a more comprehensive inspection, which is made by mechanics as part of routine maintenance. In this type of inspection, the mechanics or other authorized personnel not only inspect the life vests for their presence but also their expiration dates, that is, the expiration of their service lives or period of utility. All these activities are time consuming and error prone.

Airlines report hundreds of life vests go missing from its planes. Airlines believe that they are illegally removed but it is impossible for them to confirm that.

In light of the above, significant improvements over conventional systems and method are achieved using the system 100. For example, in contrast to a time-consuming and expensive seat-by-seat manual inspection of aircraft personal safety devices in an aircraft, in an aircraft equipped with the system 100 a comprehensive report on the aircraft personal safety devices can be nearly instantaneously obtained by simply using a management device 102 to interrogate RF signaling devices 101. The report can then be saved in a database and made available for the next pre-flight inspection, which can be conducted just as easily. Further, aircraft personal safety devices can be constantly monitored on an ongoing basis to ensure safety is provided in a timely manner.

It will be understood that the foregoing description is provided for illustration only, and not for limitation of the appended claims and their equivalents. It will further be understood that the above-described exemplary embodiments are susceptible to various modifications, changes and adaptations, and the same are intended to be comprehended within the meaning and range of equivalents of the appended claims.

What is claimed is:

1. A method, comprising:

by an RF signaling device, in response to an event occurring in connection with an aircraft personal safety device associated with the RF signaling device, generating a signal; and by a management device, in response to the signal, updating information concerning the aircraft personal safety device, the updating the information concerning the aircraft personal safety device including displaying a state of the aircraft personal safety device;

wherein the aircraft personal safety device includes a life vest, and the updating the information concerning the aircraft personal safety device includes determining a state of a container of the life vest and displaying the determined state of the container.

2. The method of claim 1, the updating the information concerning the aircraft personal safety device further including displaying a location of the aircraft personal safety device.

3. The method of claim 1, the updating the information concerning the aircraft personal safety device including generating at least one of a visible or an audible notification of the event.

4. A method, comprising:
by a management device,
generating signals to interrogate a plurality of RF signaling devices respectively associated with a plurality of aircraft personal safety devices arranged in a defined space of an aircraft;
receiving responses from the plurality of RF signaling devices; and
based on the responses, updating information concerning the plurality of aircraft personal safety devices;
wherein the updating the information concerning the plurality of aircraft personal safety devices includes displaying information indicating a current state of each of the plurality of aircraft personal safety devices in the defined space of the aircraft; and
wherein the displaying the information indicating the current state of each of the plurality of aircraft personal safety devices in the defined space of the aircraft includes
detecting at least one change in respective states of respective containers of the plurality of aircraft personal safety devices, and
displaying an image representing an aircraft cabin, the image including graphical representations of the plurality of aircraft personal safety devices associated with respective seats in the aircraft cabin, and of the current state of each of the plurality of aircraft personal safety devices based on the detecting the at least one change in the respective states of the respective containers of the plurality of aircraft personal safety devices.

5. The method of claim 4, wherein the displaying the information includes displaying a representation of a distribution of the plurality of aircraft personal safety devices in respective locations in the defined space of the aircraft.

6. The method of claim 5, wherein the representation corresponds to an interior of the aircraft.

7. The method of claim 4, wherein the updating the information concerning the plurality of aircraft personal safety devices includes
comparing the responses with historical information concerning the plurality of aircraft personal safety devices,
based on the comparing, determining whether there has been a change in a state of any of the plurality of aircraft personal safety devices, and
based on determining that there has been a change in the state of any of the plurality of aircraft personal safety devices, generating a corresponding visible indication of the change.

8. The method of claim 7, wherein the generating the corresponding visible indication of the change includes changing an appearance of a graphical user interface of the management device.

9. The method of claim 7, further comprising storing a record of the change in a database.

10. A non-transitory machine-readable medium storing processor-executable instructions configured to perform the method of claim 4.

11. A system for monitoring a state of an aircraft passenger life vest, comprising:
a container having a main body containing the aircraft passenger life vest;
an RFID tag affixed to the container, the RFID tag including a magnetic switch configured to detect opening of the container; and
a management processor configured to determine the state of the aircraft passenger life vest based on communication with the RFID tag.

12. The system of claim 11, wherein the RFID tag is configured to modulate and demodulate RF signals using Bluetooth™ Low Energy (BLE) technology.

13. The system of claim 12, wherein the RFID tag further includes:
a battery configured to provide power to the RFID tag;
an energy harvester configured to supplement the power provided by the battery; and
a power management unit configured to manage and optimize power usage by the RFID tag by controlling operations of the battery and the energy harvester;
wherein the power management unit is configured to control the RFID tag to have 4 dBm output power.

14. The system of claim 13, wherein the battery is a single coin-cell battery.

15. The system of claim 14, wherein the BLE technology has −93 dBm sensitivity.

* * * * *